US010650434B2

(12) United States Patent
High et al.

(10) Patent No.: US 10,650,434 B2
(45) Date of Patent: May 12, 2020

(54) PREDICTIVE SHOPPING

(71) Applicant: Walmart Apollo, LLC, Bentonville, AR (US)

(72) Inventors: Donald R. High, Noel, MO (US);
Matthew Allen Jones, Bentonville, AR (US); Chandrashekar Natarajan, San Ramon, CA (US); Michael Dean Atchley, Springdale, AR (US); Brian Gerard McHale, Oldham (GB)

(73) Assignee: WALMART APOLLO, LLC, Bentonville, AR (US)

( * ) Notice: Subject to any disclaimer, the term of this patent is extended or adjusted under 35 U.S.C. 154(b) by 493 days.

(21) Appl. No.: 15/453,003

(22) Filed: Mar. 8, 2017

(65) Prior Publication Data

US 2017/0262926 A1    Sep. 14, 2017

Related U.S. Application Data

(60) Provisional application No. 62/305,790, filed on Mar. 9, 2016.

(51) Int. Cl.
*G06Q 30/00* (2012.01)
*G06Q 30/06* (2012.01)
(Continued)

(52) U.S. Cl.
CPC ......... *G06Q 30/0633* (2013.01); *G06F 16/22* (2019.01); *G06K 7/10712* (2013.01); *G06K 19/06028* (2013.01); *G06N 20/00* (2019.01)

(58) Field of Classification Search
CPC .................................................. G06Q 30/00
See application file for complete search history.

(56) References Cited

U.S. PATENT DOCUMENTS 5,335,509 A    8/1994  Namisniak et al.
6,123,259 A    9/2000  Ogasawara
(Continued)

FOREIGN PATENT DOCUMENTS

EP    1176377 A1    1/2002
JP    H09330007 A    12/1997
(Continued)

OTHER PUBLICATIONS

Monal, https://web.archive.org/web/20161115201312/http://www.monahq.conn/, dated Nov. 15, 2016 (Year: 2016).*
(Continued)

*Primary Examiner* — Mark A Fadok
(74) *Attorney, Agent, or Firm* — Schmeiser, Olsen & Watts LLP; Lawrence P. Zale

(57) ABSTRACT

A budget-constrained, machine-learning system is described that creates a shopping (purchase) list and performs on-line ordering and delivery. It receives the shopper's past purchase receipts from a retail store, pharmacy and/or auto center. It may attach to a web server to acquire on-line browsing information. The system creates a Purchase List from acquired information. The system receives a budget and determines if all items on the Purchase List can be bought under the budget. If not, the items are given priority ratings. The system walks down the list to in decreasing priority rating order identifying items to purchase without exceeding the budget. The shopper may override the items identified to be purchased. Shopper override is monitored by a machine learning engine which adjusts the priority rating of the item or the period of replacement for the next shopping trip/session, allowing for more accurate results and flexibility.

12 Claims, 9 Drawing Sheets

(51) Int. Cl.
*G06N 20/00* (2019.01)
*G06F 16/22* (2019.01)
*G06K 7/10* (2006.01)
*G06K 19/06* (2006.01)

(56) References Cited

U.S. PATENT DOCUMENTS

| | | | |
|---|---|---|---|
| 6,453,687 | B2 | 9/2002 | Sharood et al. |
| 6,937,999 | B1 | 8/2005 | Haines et al. |
| 6,963,851 | B1 | 11/2005 | Szabo et al. |
| 6,965,871 | B1 | 11/2005 | Szabo et al. |
| 7,130,814 | B1 | 10/2006 | Szabo et al. |
| 7,347,361 | B2 | 3/2008 | Lovett |
| 7,356,393 | B1 | 4/2008 | Schlatre et al. |
| 7,543,741 | B2 | 6/2009 | Lovett |
| 7,810,720 | B2 | 10/2010 | Lovett |
| 8,130,102 | B1 | 3/2012 | Nguyen |
| 8,571,941 | B2 | 10/2013 | Perrier et al. |
| 8,583,512 | B1 | 11/2013 | Gupta |
| 9,830,647 | B2 * | 11/2017 | Davis ............ G06Q 40/12 |
| 9,984,410 | B2 * | 5/2018 | Davis ............ G06Q 40/00 |
| 2004/0164156 | A1 | 8/2004 | Watanabe et al. |
| 2006/0106670 | A1 | 5/2006 | Cai et al. |
| 2007/0038566 | A1 * | 2/2007 | Shestakov ...... G06Q 20/40 705/44 |
| 2009/0106085 | A1 | 4/2009 | Raimbeault |
| 2009/0299822 | A1 * | 12/2009 | Harari ............ G06Q 30/02 705/14.66 |
| 2011/0006115 | A1 | 1/2011 | Nemet et al. |
| 2011/0035299 | A1 * | 2/2011 | Casey ............ G06Q 10/08 705/27.2 |
| 2012/0130778 | A1 | 5/2012 | Cotton et al. |
| 2013/0030994 | A1 * | 1/2013 | Calman .......... G06Q 30/02 705/40 |
| 2013/0290234 | A1 * | 10/2013 | Harris ............ G06N 5/022 706/46 |
| 2014/0089134 | A1 | 3/2014 | Linh et al. |
| 2014/0136259 | A1 | 5/2014 | Kinsey, II et al. |
| 2014/0136365 | A1 * | 5/2014 | Nista ............. G06Q 30/06 705/26.8 |
| 2014/0156392 | A1 * | 6/2014 | Ouimet .......... G06Q 30/02 705/14.49 |
| 2014/0156423 | A1 | 6/2014 | Argue et al. |
| 2014/0172621 | A1 * | 6/2014 | Vittolia .......... G07G 1/0081 705/26.7 |
| 2014/0222506 | A1 * | 8/2014 | Frazer ............ G06Q 30/02 705/7.29 |
| 2014/0249916 | A1 * | 9/2014 | Verhaeghe ..... G06Q 40/12 705/14.51 |
| 2014/0279208 | A1 | 9/2014 | Nickitas et al. |
| 2015/0039462 | A1 * | 2/2015 | Shastry .......... G06Q 30/0633 705/26.7 |
| 2015/0227890 | A1 * | 8/2015 | Bednarek ....... G06Q 10/08355 705/26.81 |
| 2016/0048912 | A1 * | 2/2016 | Davis ............. G06Q 40/12 705/35 |
| 2016/0048928 | A1 * | 2/2016 | Davis ............. G06Q 40/12 705/30 |
| 2016/0109954 | A1 * | 4/2016 | Harris ............ G06F 3/017 345/156 |
| 2016/0189276 | A1 * | 6/2016 | Batra ............. G06Q 30/0633 705/26.8 |
| 2016/0371630 | A1 | 12/2016 | Jetcheva et al. |
| 2017/0262926 | A1 * | 9/2017 | High ............. G06Q 30/0633 |

FOREIGN PATENT DOCUMENTS

| | | |
|---|---|---|
| JP | 2002150057 A | 5/2002 |
| WO | 0120526 | 3/2001 |
| WO | 0127838 | 4/2001 |

OTHER PUBLICATIONS

Mona2, "Q&A with Mona—A.I. based personal shopping assistant—Alex Iskold", dated Dec. 13, 2013 (Year: 2013).*
Mona3, "Mona the world's smartest personal shopping assistant (Techstars NYC '15)", Dated 2015. (Year: 2015).*
Gate, "Chapter 15—Machine Learning", General Architecture for Test Engineering, Dated Jul. 27, 2001. (Year: 2001).*
Mona4, "Two Amazon employees leave to create 'Mona,' a Siri-like personal shopping assistant", GeekWire, dated Jun. 24, 2015. (Year: 2015).*
International Preliminary Report on Patentability in PCT/US2017/021278 dated Sep. 20, 2018; 7 pages.
International Search Report & Written Opinion in International Patent Application No. PCT/US17/21278, dated Jun. 5, 2017; 8 pages.
"Grocery King," GroceryKingApp.com, accessed on Jan. 11, 2016; 16 pages.
"H-E-B Makes Shopping Easier With a New Mobile App," HEB/com, Apr. 22, 2015; 2 pages.
"Grocery Gadgets," GroceryGadgets.com, Pingwell, Inc., accessed on Jan. 11, 2016; 1 page.
Office Action in Canadian Patent Application No. 3,015,248 dated Jun. 18, 2019; 5 pages.
Non-Final Office Action in U.S. Appl. No. 15/820,511, dated Jan. 30, 2020; 34 pages.

* cited by examiner

TABLE 1

Initial Master List output from past actions analysis device 181

| item | size | cost | period | expiration date | last purchase | 1st estim. replac. | 2nd estim. replac. | 3rd estim. replac. | priority rating |
|---|---|---|---|---|---|---|---|---|---|
| ketchup | 20 | $ 3 | 21 | 10/28/2017 | 3/1/2017 | | | | 0 |
| peanut butter | 40 | $ 5 | 30 | 8/11/2018 | 3/1/2017 | | | | 0 |
| milk | 64 | $ 4 | 20 | 3/12/2017 | 3/1/2017 | | | | 0 |
| ground coffee | 12 | $ 11 | 20 | 5/15/2017 | 3/1/2017 | | | | 0 |
| insulin | 0.1 | $ 40 | 15 | 3/27/2017 | 3/1/2017 | | | | 0 |
| oil change | --- | $ 35 | 3 mos. | 4/31/2017 | 3/1/2017 | | | | 0 |
| ... | | | | | | | | | |

TABLE 2

Master List after predictive engine 183

| item | size | cost | period | expiration date | last purchase | 1st estim. replac. | 2nd estim. replac. | 3rd estim. replac. | priority rating |
|---|---|---|---|---|---|---|---|---|---|
| ketchup | 20 | $ 3 | 21 | 10/28/2017 | 3/1/2017 | 3/22/2017 | 4/12/2017 | 5/3/2017 | 0 |
| peanut butter | 40 | $ 5 | 30 | 8/11/2018 | 3/1/2017 | 3/31/2017 | 4/30/2017 | 5/30/2017 | 0 |
| milk | 64 | $ 4 | 20 | 3/12/2017 | 3/1/2017 | 3/15/2017 | 4/4/2017 | 4/24/2017 | 0 |
| ground coffee | 12 | $ 11 | 20 | 5/15/2017 | 3/1/2017 | 3/21/2017 | 4/10/2017 | 4/30/2017 | 0 |
| insulin | 0.1 | $ 40 | 15 | 6/27/2017 | 3/1/2017 | 4/1/2017 | 4/16/2017 | 5/1/2017 | 0 |
| oil change | --- | $ 35 | 3 mos. | --- | 3/1/2017 | 6/1/2017 | 9/1/2017 | 12/1/2017 | 0 |
| ... | | | | | | | | | |

Shopping trips (sessions) are estimated to be 3/15 and 4/2.

Figure 6

TABLE 3

Purchase List from list modif. device 185    Budget = $59    Before Adjustment by Shopper 3

| Purchase | item | size | cost | period | expiration date | last purchase | 1st estim. replac. | priority rating |
|---|---|---|---|---|---|---|---|---|
| yes | ketchup | 20 | $ 3 | 21 | 10/28/2017 | 3/1/2017 | 3/22/2017 | 0 |
| yes | peanut butter | 40 | $ 5 | 30 | 8/11/2018 | 3/1/2017 | 3/31/2017 | 0 |
| yes | milk | 64 | $ 4 | 20 | 3/12/2017 | 3/1/2017 | 3/15/2017 | 0 |
| yes | ground coffee | 12 | $ 11 | 20 | 5/15/2017 | 3/1/2017 | 3/21/2017 | 0 |
| no | ~~insulin~~ | ~~0.1~~ | ~~$ 40~~ | 15 | ~~6/27/2017~~ | ~~3/1/2017~~ | ~~4/1/2017~~ | ~~0~~ |
|  |  | total: | $ 23 |  |  |  |  |  |
|  |  |  | $ 63 |  |  |  |  |  |

TABLE 4

Purchase List from list modif. device 185    Budget = $59    After Adjustment by Shopper 3

| Purchase | item | size | cost | period | expiration date | last purchase | 1st estim. replac. | priority rating |
|---|---|---|---|---|---|---|---|---|
| no | insulin | 0.1 | $ 40 | 15 | 6/27/2017 | 3/1/2017 | 4/1/2017 | 1 |
| yes | ketchup | 20 | $ 3 | 21 | 10/28/2017 | 3/1/2017 | 3/22/2017 | 0 |
| yes | peanut butter | 40 | $ 5 | 30 | 8/11/2018 | 3/1/2017 | 3/31/2017 | 0 |
| yes | milk | 64 | $ 4 | 20 | 3/12/2017 | 3/1/2017 | 3/15/2017 | 0 |
| no | ~~ground coffee~~ | ~~12~~ | ~~$ 11~~ | ~~20~~ | ~~5/15/2017~~ | ~~3/1/2017~~ | ~~3/21/2017~~ | -1 |
|  |  | total: | $ 52 |  |  |  |  |  |

Figure 7

PREDICTIVE SHOPPING

RELATED APPLICATION

This application claims priority to U.S. Provisional Patent Application entitled "Predictive Shopping," Ser. No. 62/305,790, filed Mar. 9, 2016, the disclosure of which is hereby incorporated entirely herein by reference.

FIELD

Aspects of the present invention relate to a system for creating and updating lists for reminding a shopper of items to buy, and more specifically for a system for creating and updating lists for reminding a shopper of items to buy based upon a shopper's past behavior and interests.

BACKGROUND

It is common for people to make lists, either on paper or electronic, as reminders of items to buy ("a shopping list") when they go shopping. The person (shopper) may shop at a store or shop on-line. Some on-line shopping sites allow one to manually fill and modify a shopping list.

After the items have been purchased, they are typically removed from the list. If all are purchased, there are no items left on the list. This then requires the shopper to make another list from scratch each time. This can be very repetitive and time-consuming when many of the items are the same each time the shopper shops, such as for grocery lists.

If one makes these lists locally on their smartphone or computer, they may be inadvertently erased. Also, it may be that one makes the list on their computing tablet, but goes to the store to purchase the items, but brings their phone instead of the computing tablet and not have access to the shopping list.

Since the shoppers make these from memory each time, they tend to forget to put items on the list. When the items can only be purchased in the store, this may require them to make another trip to the store.

Typically, items are added to the list, as one runs out of that item. Therefore, the shopper must live without this item until it is purchased again.

Adding or deleting items on the list is currently a manual process. Typically, it involves typing into the phone or computer a name or description of an item to purchase. Sometimes the shopper does not know the name or size of the product, which causes problems adding them to the list, or modifying them on the list.

If the shopper chooses to go to the store to purchase the products, instead of buying them on-line, the shopper must find each of the products in the store. Since the list has no relation to the product placement, the shopper strolls down the aisles until (s)he sees a product on the list. The shopper wastes time since they go through every aisle, even though there may be several aisles in which there are no products on the list.

Another problem with shopping lists, is that the shopper may not have the funds required to buy everything on the list. It becomes time-consuming trying to determine which items to buy now and which can be purchased at a later shopping trip (session).

Also, some people are busy and do not have the time to purchase items and pick up the items.

Currently, there is a need for a system that is a more efficient means of purchasing products and services that overcomes the problems indicated above.

BRIEF SUMMARY

According to aspects of the present inventive concepts, embodiments of the current invention are provided as set forth in the appended claims. Other features of the inventive concepts will be apparent from the dependent claims, and the description which follows.

The invention may be embodied as a system 100 for automatic purchase of items for a shopper 3 having a store system 150 that includes a receipts database 153 having information on items purchased by the shopper 3 in the past, a controller 160 adapted to communicate with other computing devices. The system 100 also includes a home office system 180 coupled to the store system 150, having an item file 189 having information about items purchased by the shopper 3, a past action analysis device 181 coupled to the adapted to organize, categorize and analyze information on items purchased by shopper 3 from the receipts database 153 and calculate a period of time between repeated purchases of at least one item, a predictive engine 183 coupled to the past action analysis device 181, adapted to receive the calculated periods of items, estimate future purchase dates for these items, then adjust the estimates based upon user input, a list modification device 185 coupled to the predictive engine 183 and the store system 150. The list modification device 185 is adapted to receive the time periods for each item previously purchased and create a master list indicating when each item is to be purchased again based upon the time periods received from the predictive engine 183, receive input from shopper 3 adding items to the master list, receive a maximum budgeted amount indicating the maximum amount to be spent on a shopping session, create a purchase list from the master list having items that are desired to be purchased at the next upcoming shopping session, send the purchase list to an e-commerce system to purchase the items on the purchase list if all of the items on the purchase list do not cost more than the maximum budgeted amount. If a combined cost of the items on the purchase list exceeds the maximum budgeted amount, then functioning to pare down the purchase list. The system also includes a priority/period adjuster coupled to the list modification device adapted to monitor the adjustment made by shopper 3 to the purchase list, and adjust the period of purchase or the priority rating of at least one item. A shopper's computing device 120 adapted to receive input from shopper 3, display output to shopper 3, and communicate with at least one of the store system 150 and the home office system 180.

The current invention may also be embodied as a method of purchasing items by analyzing past purchases of items to determine which are repeated purchases, determining the period of at least one item that is repeatedly purchased, estimating future purchase dates for items that are repeatedly purchased from the determined periods, building a shopping list from the estimated future purchase dates, allowing the shopper to adjust the list and receiving a budget amount.

If all items on the list cannot be purchased with the budget amount then the process continues by acquiring a priority rating of each item on the shopping list, sorting items on the list in order of their priority rating, indicating which items cannot be purchased based upon the budget amount, allowing the shopper 3 to adjust the items to purchase to result in a purchase list; and adjusting a relative priority of the items stored in a list, based upon the shopper's designation of items to purchase.

The current invention may also be embodied as a system for reminding a shopper of items to purchase having a shopper's computing device 120 adapted to interactively allow the shopper to view, modify, add items stored in a table, such as a master list, a store system 150 which has information on the past purchases of items at the retailer by this shopper, information on current products for sale by the retailer and special deals being offered by the retailer, and having stored executable code, a communications link 140 linking the shopper's computing device 120 to the store system 150. The system 100 also includes home office system 180 having a past actions analysis device 181 adapted to determine items which have been repeatedly purchased by the shopper, provide the repeatedly purchased items to the shopper's computing device, and determine the period when the shopper 3 buys the items. The system 100 also includes a predictive engine 183 adapted to receive the purchase periods for each item, predict purchase dates to buy items from the received purchase period of each item, create a purchase list from the predicted purchase dates and items manually added by the shopper 3, The home office system 180 also includes a list modification device 185 coupled to the predictive engine 183 adapted to receive a maximum budgeted amount, determine which of the most important items can be purchased without exceeding the maximum budget amount, receive input from the shopper 3 to adjust the purchase list; and provide the purchase list for on-line or in-store purchase of items on the list. There is also a priority/period adjuster 187 in the home office system 180 adapted to monitor the shopper 3 adjustments, and adjust at least one of the period and priority rating of at least one item on the purchase list.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale; emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted to facilitate a less obstructed view of these various example embodiments.

FIG. 6 is an illustration of Tables 1 and 2 showing a portion of the Master List as it would appear at two different stages of the process according to one embodiment of the current invention.

FIG. 7 is an illustration of Tables 3 and 4 showing a Purchase List derived from the Master List as it would appear at two different stages of the process according to one embodiment of the current invention.

DETAILED DESCRIPTION

At least some of the following exemplary embodiments provide an improved system and method suitable for creating and maintaining a reminder shopping list for shoppers. Many other advantages and improvements will be discussed in more detail below, or will be appreciated by the skilled person from carrying out exemplary embodiments based on the teachings herein. The exemplary embodiments have been described particularly in relation to a retail store such as a supermarket or general store for grocery and household items. However, it will be appreciated that the example embodiments may be applied in many other specific environments.

Figure 1:
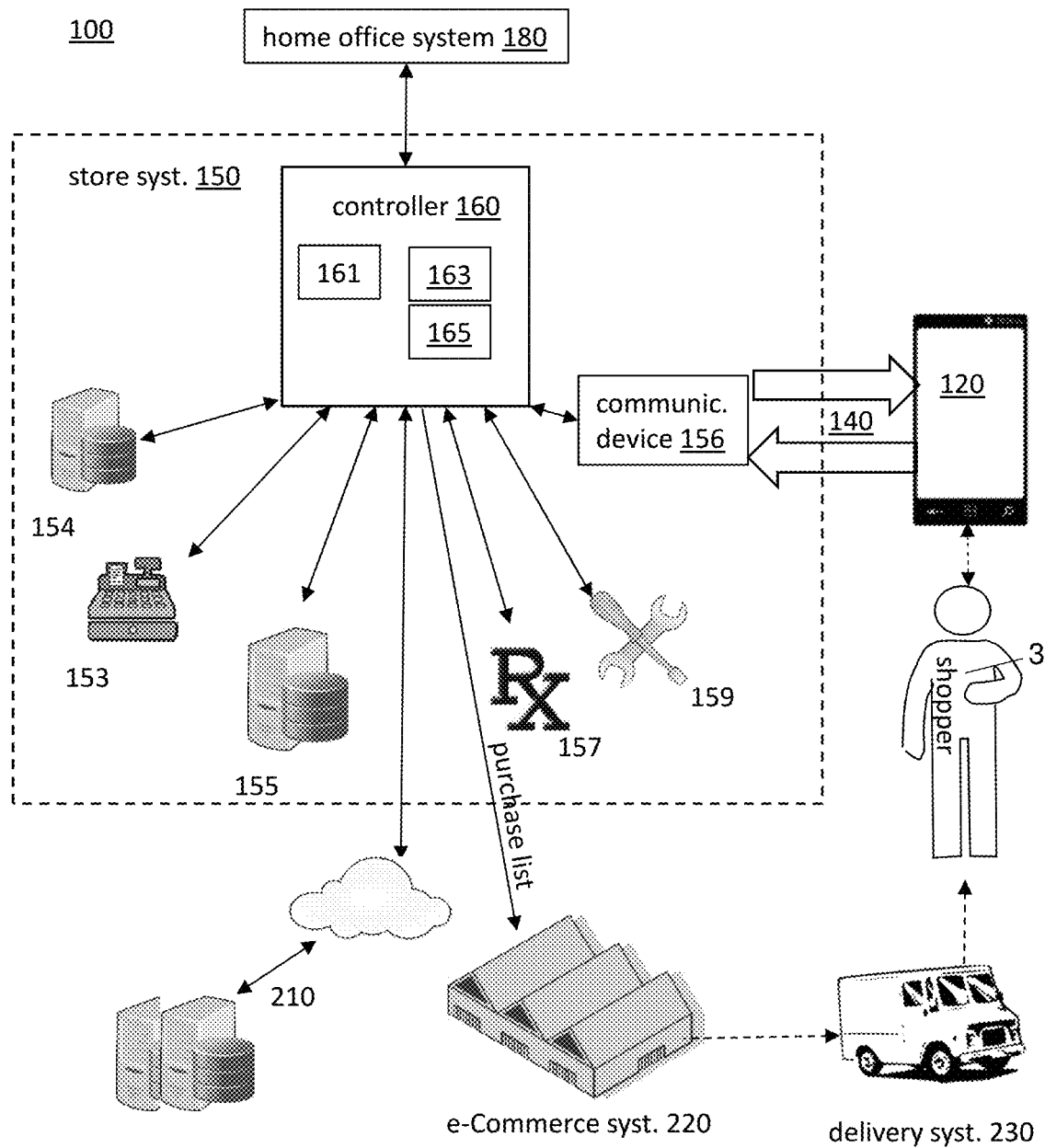
FIG. 1 illustrates an overall block diagram of one embodiment of a system according to the present invention.

FIG. 1 illustrates an overall block diagram of one embodiment of a system 100 related to a retail store, for creating and maintaining a reminder shopping list in accordance with one aspect of the present invention. Here, a shopper 3 communicates through a shopper computing device 120, through a communications link 140 with a store system 150 to set up a user profile, log into a retailer's website. The shopper 3 then retrieves a 'master list' being a stored file associated with this shopper 3. A master list is a stored file of items that the shopper may be interested in currently purchasing, or purchasing in the near future. (The creation of the initial master list may be done several ways as is described in detail below.) Items which are items intended to be purchased at the next visit to the store (or on-line shopping session) are copied from the master list to create the current shopping list. Alternatively, the shopper 3 may retrieve an existing shopping list that was previously created.

The store system 150 includes a communications device 156 which can communicate with a shopper computing device 120 in any communications means that they have in common. The communication link 140 may at least partially include a hardwired link, a link through the Internet, a Wi-Fi link, a Bluetooth link, or other presently known method of data communication.

Store system 150 includes a processor 161 coupled to a data storage device 163 which include executable storage 165 having executable code that may be run by a processor.

The shopper computing device 120 is shown here as a smartphone, but may also be a desktop computer for those shopping from their home or work, a laptop computer, a tablet computing device, or other currently known computing devices.

Store system 150 has access to information stored on various other servers and/or storage devices. These servers/storage devices may be, for example, a cash register receipts storage 153 that stores information on past purchases made by shopper 3 in a brick and mortar store.

There also may be a web server 155 which allows shopper 3 to view products on-line. The web server may track items that the shopper 3 has viewed, when and for how long, and which, if any were purchased, which is referred to as a 'click log'. Web server 155 stores the click logs by shopper and can retrieve them later.

Some of the retail stores have a pharmacy with a pharmacy database 157. The system 100 may look for and acquire prescription information of shopper 3, provided that the shopper agrees and the transfer of information meets HIPAA and other requirements.

Some of the retail stores also have an auto center that stores information of the shopper's car in the auto center database 159. This may include maintenance information which indicates when periodic service is required. For example, the date of the next oil change, air filter replacement, etc.

The system 100 may also have a link through the Internet to social media servers 210. This may supplement information provided by the shopper 3 regarding his/her personal preferences, likes/dislikes, hobbies and interests. For example, if the social media site indicates that the shopper has an interest in archery, he/she will be notified of upcoming sales for archery-related products. Also, product may be suggested that relate to the shopper's interests.

Store system 150 scans through information from the cash register storage 153 and click logs in web server 155 to find products which have been repeatedly purchased. There is a good chance that the shopper 3 will continue with the same pattern and purchase the same products in approximately the same frequency. Therefore, one or more of these repeatedly purchased products to the shopper 3 to add to the master list used to create a shopping list.

Similarly, the prescription information would indicate if the shopper 3 has any prescriptions there and if so, are any due to be picked up. If so, these are suggested to be added to the master list.

In the same manner, if it is determined by the processor 161 analyzing the auto center storage 159, if the car of shopper 3 is due for inspection, an oil change, or other maintenance. If so, these are suggested to the shopper 3.

If these suggestions are accepted, these items are added to an existing master list used to create a shopping list for shopper 3.

Alternatively, the items may be directly added to the shopping list, and the shopper 3 may delete those which he/she does not want on the list.

Optionally, system 100 has a link to social media servers 210 to acquire information regarding a shopper's interests and preferences.

Figure 2:
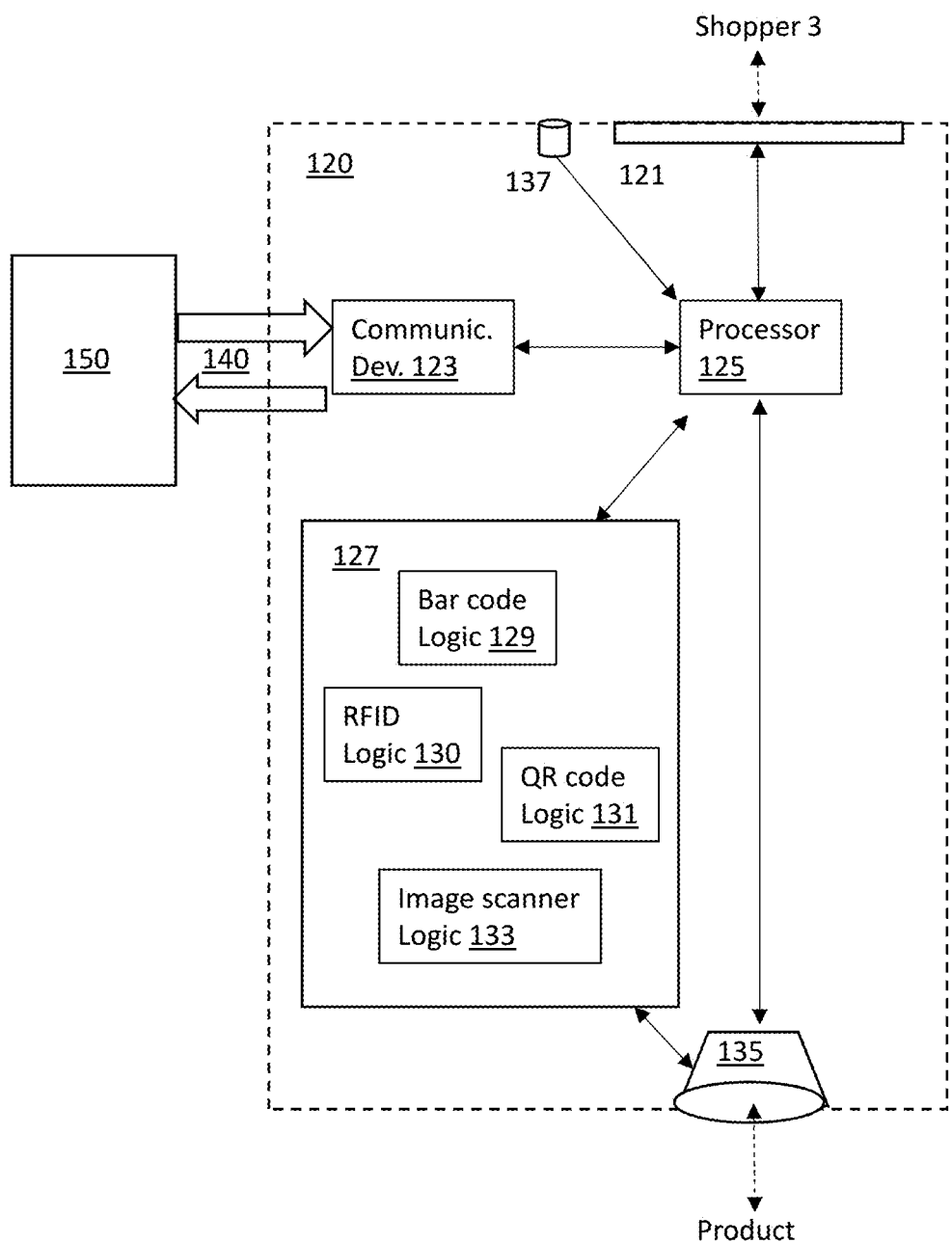
FIG. 2 illustrates the system of FIG. 1 with a more detailed block diagram of one embodiment of the shopper's computing device.

FIG. 2 illustrates a more detailed block diagram of one embodiment of the shopper computing device 120 of FIG. 1 that communicates with the store system 150 through the communications link 140. Shopper computing device 120 includes a communication device 123 which communicates in at least one common mode of communication with communication device 156 of FIG. 1.

Shopper 3 provides input to the shopper computing device 120 through an input/output (I/O) device 121. These may be the currently known I/O devices for a desktop (or laptop) computer, if shopper computing device 120 is a desktop or laptop computer. For tablets and smartphones, the I/O device is a touchscreen.

Shopper computing device 120 includes at least one storage device 127 that can store and retrieving information. This may include data and executable code which may run on one or more of the processors of the system.

Preferably, the shopper computing device 120 includes a camera 135. This may be used by shopper 3 to acquire an image of a product 5 which is then processed by the processor 125, running image scanning logic 133. The image, or information derived from the image may be matched to product information stored in data storage device 163 of store system 150 or in one of the other servers or storage devices to identify product 5. The product may then be added to the list, or found in the list and modified or deleted.

Alternatively, if the product information is small enough, it may be downloaded and stored in storage 127 of the shopper computing device 120.

Similarly, the processor 125 may run bar code logic 129, or QR code logic 131 to cause camera 135 to function as a bar code reader or a QR code reader. This would then allow shopper 3 to simply scan the bar code/QR code of product 5 to identify it.

RF signals can be sensed by communication device 123 and decoded by the processor 125 running RFID logic 130 to identify the product. Product 5 then be added to the list, or identified to be modified or deleted.

Optionally, the shopper may wear a camera 135, bar code reader, QR code reader, RFID reader or other currently known device for sensing and identifying object or products, and have a wireless link to the system.

Preferably, the master list and shopping lists will be stored in data storage device 163 in the store system 150 and accessed by the shopper computing device 120. This will allow the shopper 3 to use any computing device but still have access to the same list. However, to increase responsiveness, a copy may be also stored in storage 127 on the shopper computing device 120, and synched with the copy on the store system 150.

Most of the processing may be done on any of the processors in the system. Most of the storage, such as storage of the master list, current shopping list, and other shopping lists may be stored on any available data storage or memory. However, it is to be understood that certain processors, such as that in a smartphone, do not have the computing power of a server, or cloud of servers.

Figure 3:
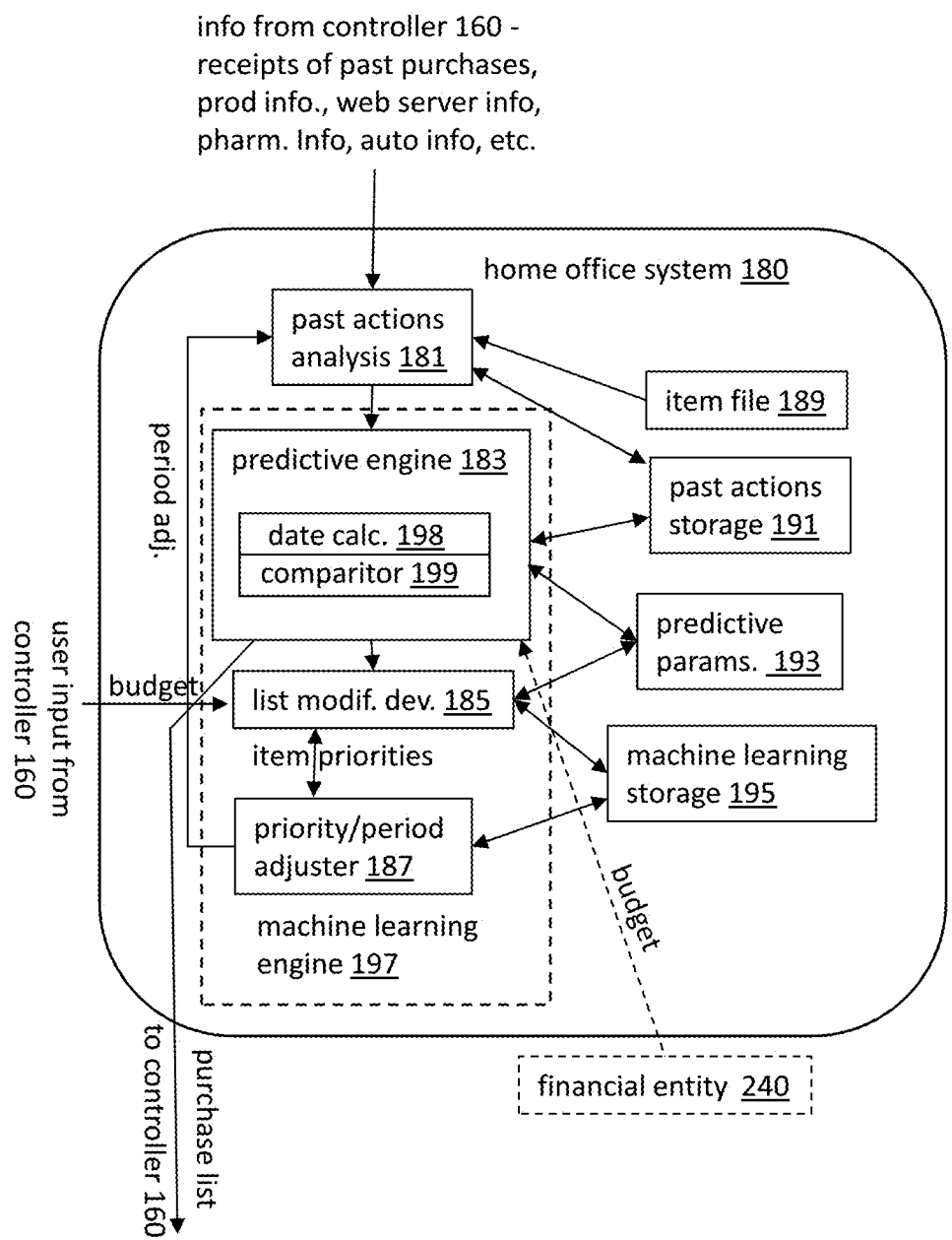
FIG. 3 is a more detailed block diagram of the home office system 180 of FIG. 1.

FIG. 3 is a more detailed block diagram of the home office system 180 of FIG. 1. A machine learning engine 181 receives both in-store and on-line receipts for past purchases for shopper 3 from receipts storage 153, also referred to as a 'market basket' of past purchases.

A past action analysis device 181 also receives information from an item file 189 which has information on products including those on past purchase receipts. This may include the product category, type, size, expiration date, etc. This allows the past action analysis device 181 to identify the product, type and category of product and similar products.

The past action analysis device 181 then can look at the repeated purchase dates of an item or category of items and determine an approximate time period between purchases.

For pharmacy products, the prescription dates are determined and an average time between prescriptions is determined.

All parameters either received or calculated by the past action analysis device 181 may be stored in past analysis storage device 191.

A predictive engine 183 is coupled to the past actions analysis engine 181 and a predictive parameter storage device 193 and receives the past periods of time which elapse, on average, between purchases of items, and uses these to predict when the next purchase will be for each item. These are stored in the predictive parameter storage device 193. Initially, these are set to the period between purchases determined by the machine learning engine. However, as described below, these are adjusted based upon new information learned and self corrects over time.

A list modification device 185 is coupled to the predictive engine 183 and a machine learning parameter storage device 195. This also communicates through the controller 160 to the shopper's computing device 120 to interact with the shopper 3. List modification device 185 displays items from the master list which are desired to be purchased on the current shopping trip, or on-line shopping session to shopper 3 as the "purchase list". This includes items added to previously added to the master list, and those determined to be purchased by the predictive engine 183.

In a set-up phase, the shopper 3 may be requested to input information to rank general categories of products and services by their relative importance, resulting in a priority rating. The predictive engine 183 knows the type of product and the initial rank and can provide general estimates for items that do not yet have a priority rating.

The list modification device 185 receives a maximum budgeted amount (a 'budget') to be spent on this shopping trip or on-line shopping session. If all items on the purchase list cost less than the budgeted amount, the purchase list remains as it is. However, if the items on the purchase list cost more than the amount budgeted, then the purchase list should be modified.

List modification device 185 first looks to a machine learning storage device 195 to find a priority rating for products on the master list and purchase list.

For items which do not have a priority rating, the prediction engine 183 generates an initial priority rating for an item based upon a general priority rating provided by the shopper 3, or set to a default priority rating.

List modification device 185 then sorts the purchase list by the priority rating of each item.

The list modification device can interact with the shopper 3 through controller 160 and shopper's computing device 120 to display and allow the user to delete or replace items on the list.

A priority/period adjuster 187 monitors the deletions, modifications and additions made to the purchase or master list. The list modification device 185 and the priority/period adjuster 187 together can be considered a machine learning engine 197. The priority/period adjuster 187 iteratively adjusts the priority rating stored in the machine learning storage device 195 based upon which items are chosen to be purchased and which are not chosen to be purchased. This may be performed by many different algorithms. One such algorithm is to incrementally decrease the priority rating of any item chosen not to be purchased.

Another would be to both decrease the priority rating of any item not chosen to be purchased and incrementally increase the priority rating of item chosen to be purchased.

Another embodiment of the algorithm would change the priority rating of items chosen to be purchased to be above the priority rating of items not chosen to be purchased.

In an alternative embodiment, the system may acquire information as to why an item is not being purchased. If the reason is that the item is not used up yet, or the service is not due yet, then the repeated purchase period calculated by the prediction engine 183 is incrementally extended to adjust and correct the period. This updated period is stored in the predictive parameter storage device 193 and used in future period predictions for this item.

If the reason given for the decision not to purchase an item is that another item of the same category is being purchased in its place, then there is no adjustment of the period or the priority rating.

If the reason that the item is being purchased is that there is currently a sale or other incentive, then again, the priority rating and period are not adjusted.

As the system 100 operates, it continually adjusts the period used to predict the next purchase date and the priority rating of each item. This allows it to make more accurate predictions of items to be purchased with little input from the shopper as the system 10 is used.

Since it can learn from its inaccuracies and adjust, it is a flexible system which can adjust to follow the changing tastes and different item usage of shopper 3.

In an alternative embodiment, the shopper 3 may pre-authorize the home office system 180 to make or send the purchase list to controller 160 to contact an E-Commerce system 220 and make on-line purchases of the items on the purchase list. This may be done by controller 160 sending a text message, email or other communication to shopper 3 indicating the items to be purchased. This can be set up to either make purchase only when the shopper approves the purchase, or an automatic mode in which it makes purchases when the shopper 3 does not act to stop the purchases.

For example, the shopper 3 may set the system to have automatic purchase if the purchase list is below the maximum budged amount.

In another embodiment, the shopper 3 may allow on-line purchasing, packaging and delivery of items when the purchase list is below the maximum budgeted amount. Delivery may be made by the E-commerce system 220 or by requesting delivery by a separate delivery company 230.

In another embodiment, the shopper may choose to pick up the purchased items at the store.

The functioning of a system 100 for generating and maintaining a reminder shopping list according to one embodiment of the current invention is described in connection with FIGS. 1, 2, 3 and the flowchart of FIGS. 4A, 4B and 4C.

The process starts at step 301. In step 303, the shopper contacts a retailer's webserver 155 through store system 150, and sets up a shopping profile. This profile may include the shopper's preferences such as types of products that they do, and do not wish to see or buy.

In step 305, the system searches to determine if it has a master list for this shopper. If no master list is found in step 307 for this shopper ("no") then a master list is created in step 310. The master list will be saved for use next time the shopper wishes to purchase products.

A "purchase list" is created by identifying the items on the master list that are intended to be purchased at the current shopping trip or on-line shopping session.

As the items are placed in the cart, or purchased, the items are stricken out or otherwise indicated as already purchased on the shopping list.

The system may look up past purchase logs, e-receipts from in-store purchases acquired from the cash registers and from web purchases. The system may also monitor what the shopper has been viewing (clicking on) on the website, and how much (s)he has spent reviewing each webpage, referred to as "click logs".

It will then determine products which have been repeatedly viewed in the past from past click logs for this shopper. These products will be added to the current shopping list, or the master list if it is to be repeated in future lists. Optionally, these products are suggested to the shopper that can then add them to the current shopping list, store them in the master list, or discards them.

After the current shopping list and the master list have been created, in step 351 the shopper can manually add items. In step 351, the shopper determines if (s)he wants to add a product. In step 351, the shopper is asked if the item is to be added to the current shopping list and if so, is added in step 355.

In step 357, the system 100 may suggest items related to the ones that are on the current shopping list. For example, the system 100 has a prestored list of products which are most commonly sold together. Therefore, if one of the products on the purchase list matches one of the products in the prestored comparable product list, the matching product may be suggested to be added to the current shopping list (and/or the master list). Similarly, the system suggests products which are consistent with the shopper's preferences and interests that the shopper provided when (s)he set up his/her profile.

Also, the system may look up the shopper in the social media servers 210 of FIG. 1. If there are any interests or preferences described there, they may be used in a similar manner as the interests and preferences provided by the shopper. Processing continues at step 359.

If no items are to be added in step 351 ("no"), then processing continues at step 359.

In step 359, it is determined if shopper 3 is finished adding items. If so, ("yes"), then processing continues at step 361 of FIG. 4B.

In step 361, list modification device 185 receives a maximum budgeted amount from the shopper 3. This is provided to shopper's computing device 120 through the communication link 140 through the controller 160 to the list modification device 185.

Alternatively, the budget is provided by communicating with a financial entity and then using an account balance or calculating a maximum budgeted amount from an account balance.

In step 363 it is determined if all items can be purchased for less than the maximum budgeted amount. If so ("yes"), then processing continues at step 381 of FIG. 4C.

If not, ("no"), then in step 365, the priority ratings for the items on the purchase list are acquired by the predictive engine 183.

In step 367, the list modification device 185 sorts the purchase list by priority ratings.

In step 369, a purchase list is created having items that may be purchased without exceeding the budgeted amount, starting with items having the highest priority rating and moving toward the items with lower priority ratings.

In step 371, the purchase list is displayed to the shopper 3.

In step 373, the shopper 3 is permitted to adjust the purchase list. Optionally, a relevant portion of the master list is also displayed to indicate the other items which are not being purchased.

If the shopper 3 chooses to adjust the purchase list ("yes"), then in step 375 an item is selected.

In step 377 it may be modified or deleted from the purchase and/or master lists.

The priority rating of items deleted or modified are interactively adjusted by the priority/period adjuster and updated in the machine learning storage 195. These priorities will be used for organizing the master list and purchase list for the next shopping trip/session.

In an alternative embodiment, the list modification device 185 may request from shopper 3 information as to why the purchase list has been changed. If the result is that the purchase of one or more items is more important than the purchase of other items, priority/period adjuster 187 adjusts the priority rating of the items accordingly and stores them in machine learning storage 195.

If the reason provided for the change in the purchase list is that the product is not used up at this point, or it is not time for a given service yet, then the predictive engine 183 adjusts the period for purchase of the item or service.

If the reason that the purchase list is changed that is due to a temporarily reduced price (a "sale"), change of product, or other reason which does not deal with a purchase period or priority rating of the item, then no change is made to the purchase period or priority rating of any of the items on the purchase list.

In step 381, it is determined if shopper 3 is going to purchase the items on-line. If not ("no"), processing continues at step 395.

If so, ("yes"), then in step 381, system 100 requests the approval of shopper 3 to purchase items on the purchase list.

In one embodiment, shopper approval is required to act to make the purchase. Therefore, it would require shopper 3 to select an approval option on shopper's computing device 120, ("yes") in step 383.

In an optional embodiment, the shopper 3 can act to stop the purchase within a predetermined period. If the shopper does not act to stop the purchase, it will automatically occur.

In step 385, the purchase list is then sent from list modification device 185 to controller 160 and then to E-Commerce system 220 to order the items on the purchase list.

In step 387, the purchased items are delivered to an address that was previously provided by shopper 3.

In an alternative embodiment, the shopper 3 may set a default for pick-up of the purchased items. In this case shopper drives to the store to pick up the items.

In step 389 the files are saved and closed.

In step 391 the shopper is logged out of the system.

In step 381, if the shopper has indicated that this is not an on-line purchase ("no"), then processing continues at optional step 395.

Optionally, the shopper 3 may have previously set a default which indicates that the purchases will be in-store purchases.

Optionally, the shopper 3 may review a store map of the store that the shopper plans to shop in step 395 and look up the store locations for the items on the purchase list.

In step 397, it sorts the purchase list by store location to group together items which may be found close to each other.

In step 399 the purchase list is shown to the shopper 3.

In step 401, the shopper makes the in-store purchases.

The process ends at step 393.

Figure 4A:
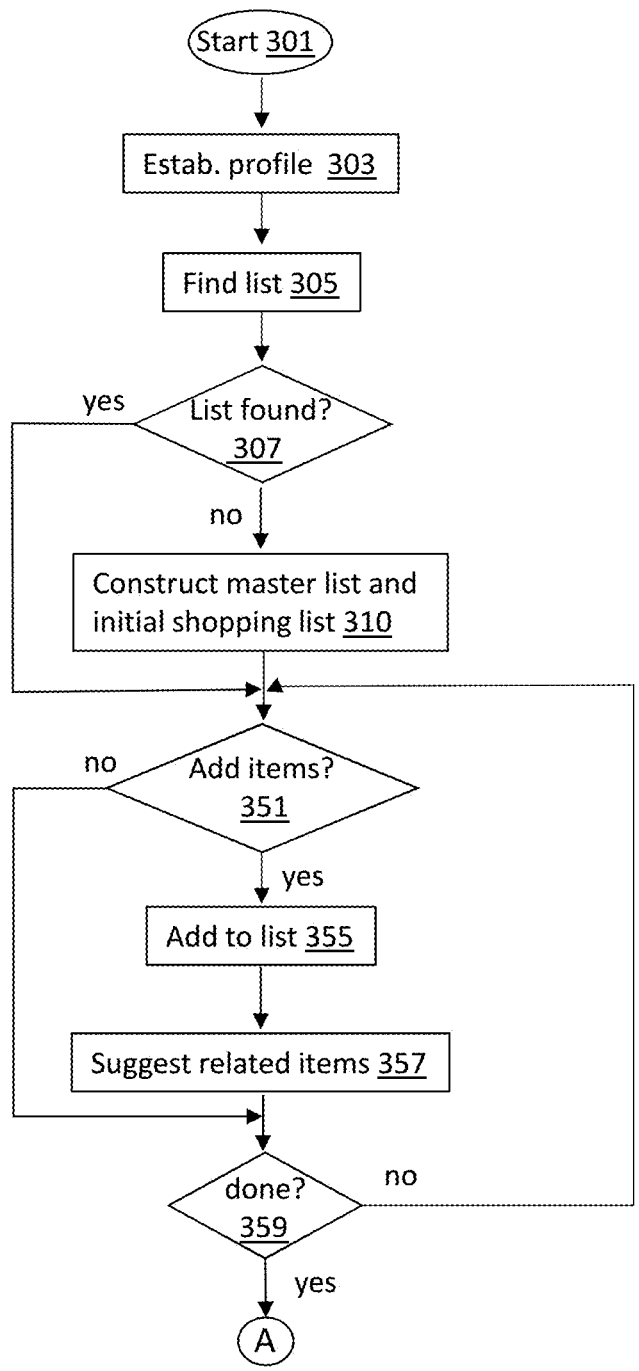
FIGS. 4A, 4B and 4C together are a flow chart illustrating the functioning of one embodiment of the present invention.
Figure 4B:
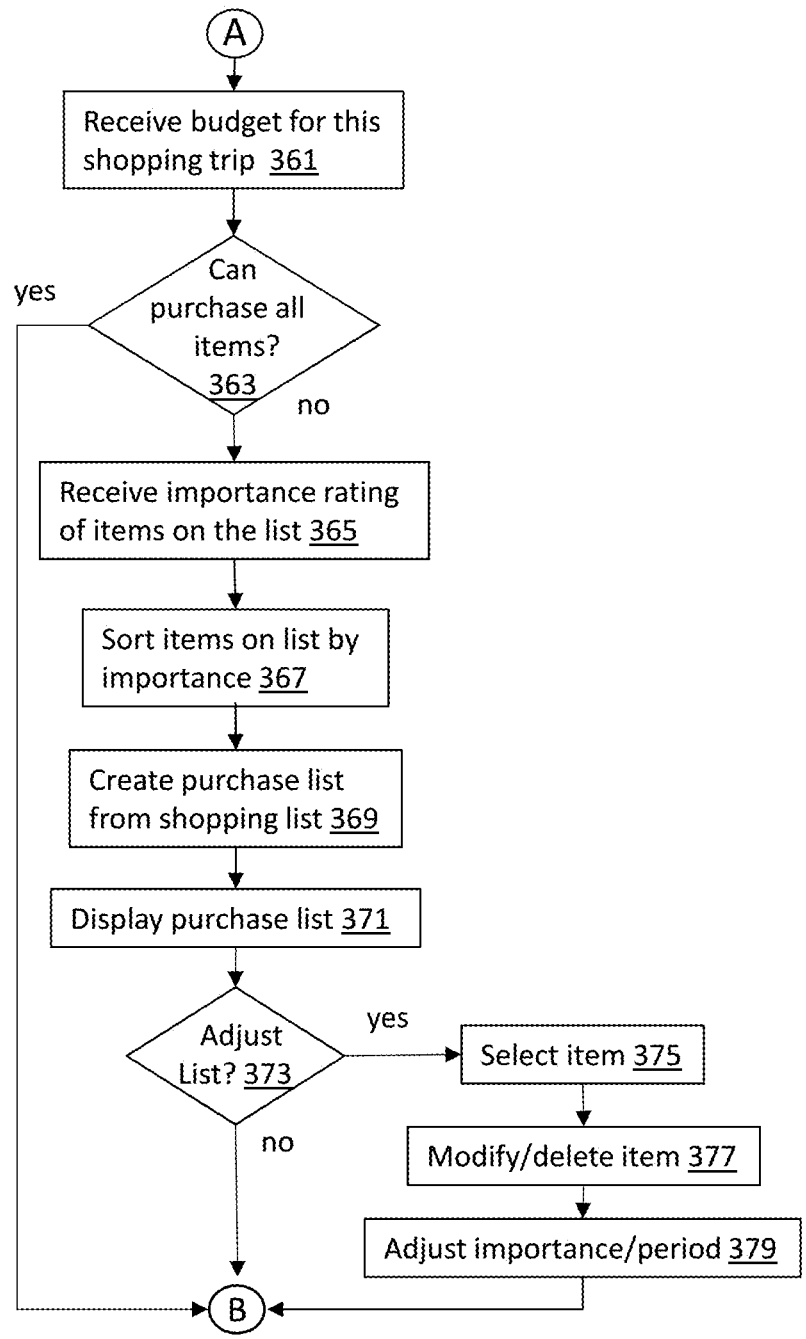
Figure 4C:
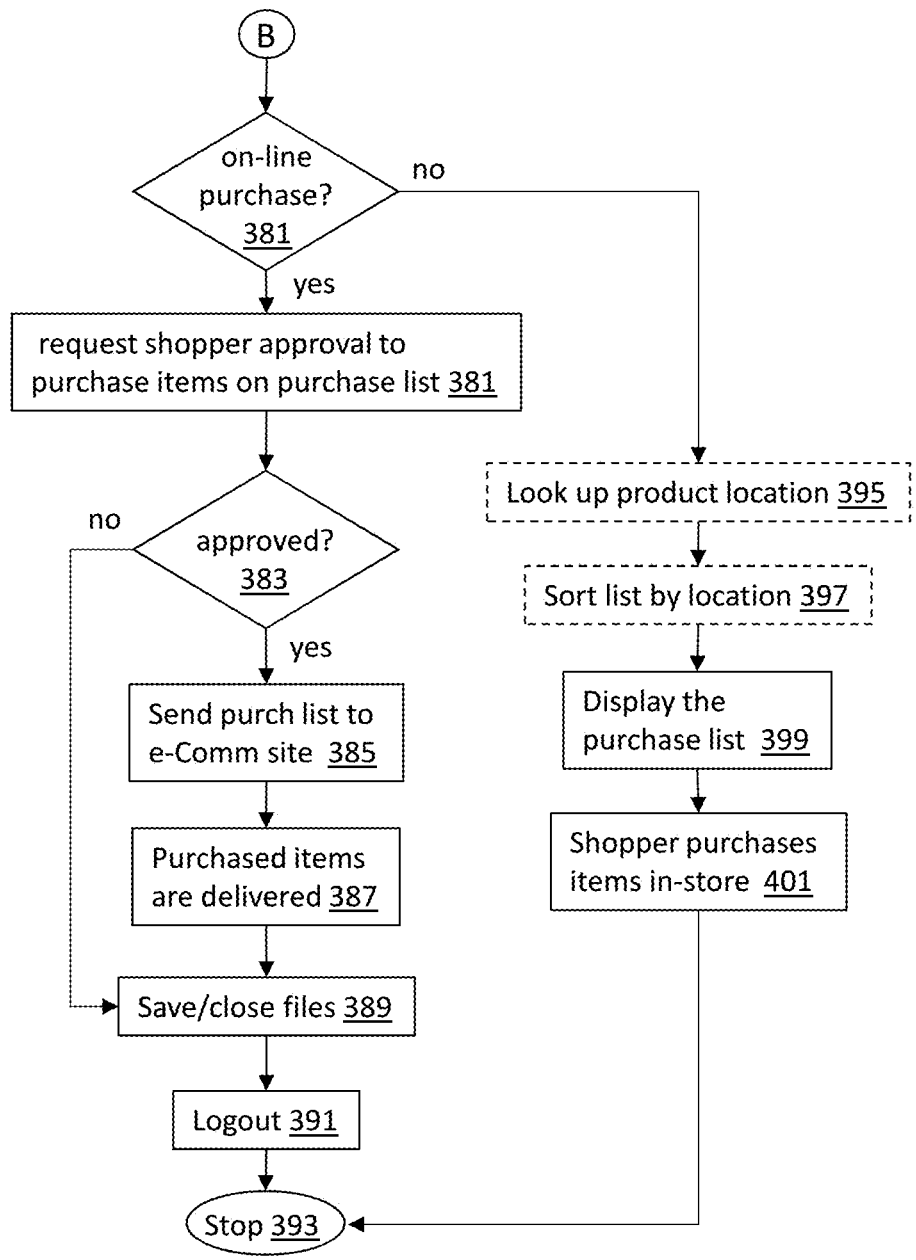
Figure 5:
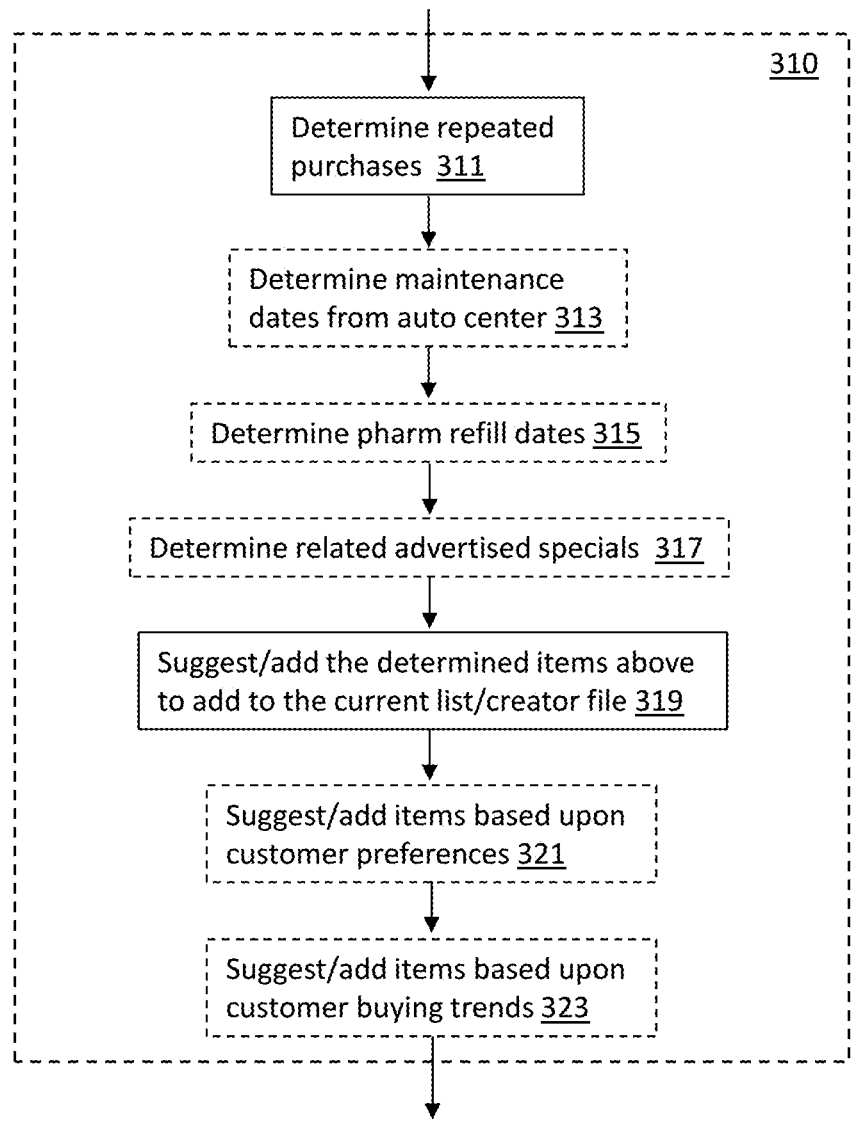
FIG. 5 is a more detailed flow chart of a block 310 of the flow chart of FIG. 4A.

FIG. 5 is a more detailed flow chart of step 310 of FIG. 4A, for creating an initial list. In step 311, past purchase information, such as e-receipts, on-line purchases and click logs are analyzed for repeated purchases. Alternatively, the period and frequency of purchases may be determined. Alternatively, as indicated above, the amount purchased and the consumption rate can be determined to estimate when the product will run out. Also, the shopping frequency and period can be determined to estimate when the next shopping trip will be. This information may be used to create or update a master list.

Optionally, in step 313, auto maintenance information may be analyzed to determine the upcoming maintenance dates.

Optionally, in step 315, the system 100 contact pharmacy storage 157 to determine prescriptions and prescription refill dates.

Optionally, in step 317, advertised sales or special offers are matched to items in the master list. They also may be matched to the display date or the expected date that they will run out and need to be re-purchased. It is then determined which sales are within a predetermined date range relating to the products on the master list.

In step 319 the items determined in steps 311 through 317 are suggested to be added to the master list, and ultimately to the shopping lists to the shopper. Alternatively, the items determined in steps 311 through 317 are added to the master list, and the shopper 3 may delete or modify the added items.

Optionally, in step 321 the system may suggest items to add to the master list based upon shopper preferences.

In step 323, the system will categorize products or rate products by one or more parameters. For example, the product may be organized according to a cost parameter. They also may be organized by a health rating parameter. Once the products are organized, one can correlate purchases with each of the parameters to identify trends. Therefore, one may look at the purchases and see that the shopper is increasingly buying more healthy products. Therefore, if there are two equivalent products to suggest to the shopper and one has a higher health rating than the other, the higher rated product should be suggested consistent with the increasing health trend.

The system will continue to track the shopping habits of the shopper to enhance the shopper's online shopping experience.

Once the shopping list is in the system, it may be shared with friends and family through chat, email, text, or social media.

There are certain products which are typically sold together. For example, ingredients for a salad are typically sold with a dressing. Once the system 100 sees these ingredients on the current shopping list, it can suggest to the shopper to also buy salad dressing.

System 100 can also have a listing of products equivalent to those on the current shopping list, but are beneficial for other reasons. These typically are products which the shopper does not buy. For example, one product may be healthier than another, or one may cost less. The system can make suggestions to add these items as replacements for those on the current shopping list.

The web server 155 will have information about upcoming sales and special offers. This information can be cross-referenced against the current shopping list to identify similar products which are on sale and suggest these products to shopper 3 as alternatives.

The recommendations may also be for convenience. For example, if the shopper 3 has a large item on the list or is in the process of purchasing a large product, the system 100 can check with the auto center storage 159 to determine the size of the vehicle shopper 3 drives. If the car is too small to fit the product, a notice is provided to the shopper and the shopper is given the option of purchasing delivery of the product. The system may provide a discount of these services.

Since system 100 knows of repeatedly purchased products, it can suggest that these items be purchased at a discount if they are added to the current shopping list/master list and automatically purchased. Optionally, the shopper could set up these items to be automatically purchased and shipped on a recurring basis.

In an alternative embodiment, the products are analyzed to determine which are repeatedly purchased, and to estimate when this product will be purchased again. These can be deemed to be consumed over time. Therefore, the past purchase records, such as on-line purchases and cash register e-receipts (for purchases in stores), can be analyzed to find products that have been repeatedly purchased. These will be periodically purchased and have a consumption rate associated with each product. Based upon the amount of the product purchased and the amount consumed over time, the system 100 can predict when the product will be used up. For example, it may be determined that the shopper buys a quart carton of milk generally each week. This means that a quart of milk is purchased and consumed within a week before it is replenished. Milk, in this example, has a consumption rate of one quart per week.

Peanut butter may have a consumption rate of a 40 ounce jar every two months. Since the purchase records indicate the container size, and the frequency in which these are purchased, the amount consumed over time can be calculated. Therefore, system 100 can predict when each of these products is expected to run out.

Referring back to FIGS. 1 and 2, items may be added to the current shopping list/master list by the shopper 3 in several different ways. Shopper 3 takes a photo of a product 5. In one embodiment, the shopper computing device 120 includes a camera 135. This image is analyzed by conventional image recognition software in image scanner logic 133 to find a product which most closely resembles the image. Processor 161 searches product information storage 154 and returns images (or descriptions) of several products which resemble the image being analyzed. Shopper 3 can select one which he/she believes matches product 5.

Optionally, the shopper computing device 120 has a camera 135 and logic 129, 130, 131 which allows it to function as a barcode reader, a radiofrequency ID (RFID) device, and/or a QR code reader. Therefore, the barcode, RFID, or the QR code may be scanned and read into the system providing an identification of product 5.

Shopper 3 may also see an advertisement for an item he/she may wish to purchase and scans the image of the item with his/her image scanner (133, 135) to identify the product.

Shopper computing device 120 may include a microphone 137. This may be coupled to voice recognition code stored in storage 127 which will allow the shopper to speak into the microphone 137 to identify a product.

Once product 5 is identified, the shopper 3 can then add the item to the current shopping list/master list, modify or delete the product.

As indicated above, the shopper may select items and modify or delete them manually. Another embodiment of the present invention reviews the cash register e-receipts, or logs into the on-line web server 155 and identifies which items have been purchased. These can be automatically removed from the current shopping list. If this is done while the shopper is still in the store, one can identify if there are any items that were missed.

The purchase receipts also indicate how frequently a shopper goes shopping. Therefore, given a shopping date, the system can determine which products will run out before the next expected shopping date. These products will be suggested to the shopper to be added to the current shopping list.

The invention may become clearer if it an embodiment is described in use. A shopper uses his smartphone and downloads an App for the desired retail store employing the current invention. The user runs the App to contact the store system 150 which is a pool of servers and sets up an account with login information the first use, providing the shopper's preferences and interests.

The shopper then selects the "sign in" button on the App running on his smartphone and inputs his login information to log into his account. The home office system 180 looks to see if the shopper has a current master list. If one is not found, then the home office system 180 analyzes this shopper's past purchases, both on-line and in-store, any prescription center information, auto center information. It then determines how often the shopper shops, the products repeatedly purchased, when products will be running out and saves this information on the master list, being a file stored in memory on the store system 150 and a synchronized copy stored on the shopper's computing device 120, which may be a smartphone. The smartphone's processor then runs code stored in its memory that can selects the items that are repeatedly purchased that will be running out before the estimated next shopping day, and puts them on the shopping list.

The home office system 180 can also suggest products which are similar, but less costly to the shopper to add to the list, suggest sales or special deals n similar product to those on the list, suggest other products which are typically purchased with at least one of those on the shopping list.

The home office system 180 may also suggest picking up pharmacy refills, scheduling auto maintenance service, or suggest pre-purchased items or bulk sales special deals, such as car washes or gasoline purchases.

Products may be suggested to the shopper which correspond to his preferences or interests provided during set up of the account. The store system 150 may log into social media servers 210 to identify the shopper's interests and preferences and suggest products consistent with these interests and preferences for the shopper to add.

The home office system 180 may also analyze the purchase records to categorize products/services and identify trends in purchases. Grocery product categories may relate to cost, fat content, fiber content, gluten content, etc. Categories of the auto department may be required maintenance, racing equipment, luxury equipment, etc. Any currently known categories of products or services may be used with the current invention. Categories are correlated with increased sales or decreased sales. This may be measured in either sales dollars or sales volume. Products consistent with the trends may be suggested to the shopper.

The shopper 3 may accept, modify and accept the suggested products/services and add them to the master list and/or the shopping list. The shopper 3 may also identify products to either add to, modify or delete from either or both lists by scanning an advertisement showing a product which is passed to the home office system 180 which performs image processing to identify the product. The shopper can also scan bar codes, QR codes, or RFID tags to identify the product.

As one fills their shopping cart with the products, they may be manually marked as being in the shopping cart. The system may be coupled to the cash register receipts which indicate on the shopping list as each product is purchased.

When the shopper 3 is ready to start another shopping trip (or on-line shopping session). He/she activates the App on his smartphone and logs into an account on either the store system 150 or the home office system 180. The shopper 3 is then given the options of looking at the current shopping list, if one exists, or creating another one from the master list, and the process above is repeated.

Example

The functioning of the current system 100 may be seen more clearly as we walk through an example using sample data.

During a first run, there are no item priority ratings or purchase periods, Master List or Purchase List. Therefore, past actions analysis device 181 reads through the receipts of past purchases made by shopper 3, and extracts names of items purchased, dates of purchase, size and costs of the items purchased, etc. from receipts database 153. It also collects information on categories of the items from item file 189. From this information, it can calculate an approximate period of time ("period") between purchases of the same items or equivalent items, as shown in Table 1 of FIG. 6. Equivalent items are similar items in the same category which may compete with each other, such as two different brands of ketchup. Past actions analysis device 181 may simply average the time between purchases of equivalent products or calculate other known statistical parameters which give an indication of the time between purchases.

Table 1 only shows a portion of the Master List. Since shopper 3 may have purchased many items there will be too many to show here, so a simplified subset is shown.

Once the period is determined by the past actions analysis device 181, it is past to the predictive engine 183 which uses this as the initial period. Predictive engine 183 is coupled to and receives information from past analysis device 181. Predictive engine 183 may employ a conventional date calculator 198, which may be implemented in hardware or hardware and software, that can add a purchase period to a date of last purchase for an item to result in a next replacement date. It may also employ a comparator 199 to accept the earlier of the calculated next replacement date and the current expiration date.

In this example, it appears that the last purchase date was a shopping trip (session) on Mar. 1, 2017 in which the items purchased shown in Tables 1-4 of FIGS. 6 and 7. For the item "ketchup" in Table 2 of FIG. 6, the first estimated replacement date is Mar. 22, 2017. The expiration date is Oct. 17, 2028. Since Mar. 22, 2017 is earlier than Oct. 28, 2017, the first estimated replacement date is not replaced with the expiration date.

Predictive engine 183 then adds the period for "ketchup" to the first estimated replacement date to obtain the second estimated replacement date, etc. The estimated replacement dates are shown as bold text in Table 2 of FIG. 6.

The first item to run out is milk estimated to run out by Mar. 15, 2017. Therefore, system 100 suggests to shopper 3 to have a shopping trip (session) on March 15. Shopper 3 also indicates that the next expected shopping date will be April 2. Therefore, the items which will be running out before April 2 should be purchased in the March 15 shopping trip (session).

List modification device 185 copies items that are to be purchased from Mar. 15, 2017 to Apr. 1, 2017 and creates a purchase list, shown in Table 3 of FIG. 7. List modification device 185 also receives a maximum budgeted amount ("budget") which is $59 for this shopping trip (session). All of the items on the purchase list cannot be purchased since they total more than $59. Therefore, the list is typically sorted by priority and the items with the highest priority are designated to be purchased. This continues moving down the list until no more items can be purchased without exceeding the budget.

In this initial case, there are no past priority settings and they are all equal. Therefore, the purchase list in Table 3 would be shown to the shopper 3 and the shopper could adjust the list through list modification device 185. The result is shown in Table 4 of FIG. 7. Insulin, which was marked as not being purchased during this shopping trip (session) in Table 3, was moved up the purchase list by shopper 3 and will now be purchased.

The list modification device 185 may request that the shopper 3 indicate why insulin is being purchased instead of coffee. If the shopper 3 answers that it is because it is a more important item to have, then the priority/period adjuster 187 increases the priority rating of insulin and decreases the priority rating of coffee. These adjusted priority ratings for insulin and coffee are stored in the Master List for subsequent shopping trips (sessions).

In other cases, the shopper 3 may indicate that the reason an item was taken off the list is because it is not close to running out, and there is a large unused supply remaining. In this case, the shopper 3 will identify the reason. This means that the period calculated for this item is too short. The period is then incrementally extended and stored in the Master list for subsequent shopping trips (sessions).

In another embodiment of system 100, preferences may be initially set by the shopper 3. If the shopper 3 selects automatic on-line ordering and automatic delivery, the system 100 can determine items to be purchased, identify the most important ones, purchase them on-line according to a budget, and have them delivered to the shopper 3. This can function as an automated replenishment system.

Since it is possible to move software, routines and processes and functionality from one computing device to another, it is well within the spirit of the invention to move some of the functionality from the one of the devices, such as from controller 160 to either shopper's computing device 120 or the home office system 180, for example. There are many functions which can be performed by other computing devices.

Although a few examples have been shown and described, it will be appreciated by those skilled in the art that various changes and modifications might be made without departing from the scope of the invention, as defined in the appended claims.

The invention claimed is:

1. A system that communicates with an e-commerce system to automatically purchase items for a shopper comprising:
 a store system comprising:
  a receipts database having information on items purchased by the shopper in the past, and
  a controller adapted to:
   make automated purchases through the e-commerce system, and
   communicate with other computing devices;
 a home office system coupled to the store system, comprising:
  an item file memory, having stored information about items purchased by the shopper;
  a past actions analysis device coupled to the controller adapted to organize, categorize and analyze information on items purchased by shopper from the receipts database and calculate a period of time between repeated purchases of at least one item;
  a predictive engine coupled to the past actions analysis device, adapted to receive the calculated periods of time between repeated purchases of items, estimate future purchase dates for these items, then adjust the estimates based upon user input;
  a list modification device coupled to the predictive engine and the store system, adapted to:
   receive the time periods for each item previously purchased and create a master list indicating when each item is to be purchased again based upon the time periods received from the predictive engine;
   receive input from shopper adding items to the master list;
   receive a maximum budgeted amount indicating the maximum amount to be spent on a shopping session;
   create a purchase list from the master list having a plurality of items that are desired to be purchased at the next upcoming shopping session each listed on a separate line from top to bottom, with the top item being the most important to the bottom line being the least important;
   display the purchase list through the shopper's computing device to the shopper;
   send the purchase list to an e-commerce system to purchase the items on the purchase list if all the items on the purchase list do not cost more than the maximum budgeted amount;
   if a combined cost of the items on the purchase list exceeds the maximum budgeted amount, then functioning to interact with the shopper's computing device to move items above other items to indicate their relative importance until all are organized by importance; and
   delete items starting from the bottom of the purchase list until the items remaining cost does not exceed the maximum budgeted amount;
  a priority/period adjuster coupled to the list modification device adapted to:
   monitor the adjustment made by shopper to the purchase list, and
   adjust the priority rating of at least one item based upon the shopper's adjustments and store the updated priority ratings for later use; and
  wherein the shopper's computing device comprises:
   an I/O device adapted to receive input and display output;
   wherein the shopper's computing device is configured to:
    receive input from shopper through the I/O device,
    display output to shopper through the I/O device, and
    communicate with at least one of the store system and the home office system.

2. The system of claim 1 further comprising:
 a past actions storage device coupled to the past actions analysis device, adapted to receive and store a period of time between repeated purchases for a plurality of items.

3. The system of claim 1, wherein the shopper's computing device further comprises:
 a camera; and
 executable code that when run:
  interacts with camera and allows the shopper to take a picture of product,
  identifies the product, and
  allows the user to add item to the master list.

4. The system of claim 1, wherein the shopper's computing device further comprises:
 bar code scanner; and
 executable code that when executed:
  causes the bar code scanner to read a barcode,
  determines an item for sale from the bar code; and
  adds item to the master list.

5. The system of claim 1 wherein the store system further comprises:
 a pharmacy database having information on past prescription purchases, coupled to the controller.

6. The system of claim 1 wherein the store system further comprises:
 an auto center database having information on past automotive purchases, coupled to the controller.

7. The system of claim 1 wherein the list modification device is further adapted to:
 categorize items purchased by the shopper;

identify at least one trend relating to the categories of the items purchased for this shopper; and suggest to the shopper that a product/service offered by the store is consistent with an identified trend and should be added to the master list.

8. The system of claim 7 wherein the list modification device is further adapted to:

suggest that a healthy product replace a similar product on the master list, if the identified trend shows an increase in the purchase of healthy products over time.

9. A system of automatically purchasing items for a shopper from an e-commerce system comprising:

a shopper's computing device adapted to interactively allow the shopper to view, modify, add items stored in a table, such as a master list;

a store system which has information on the past purchases of items at the retailer by this shopper, information on current products for sale by the retailer and special deals being offered by the retailer, and having stored executable code capable of purchasing items on the updated purchase list through the e-commerce system;

a communications link linking the shopper's computing device to the store system;

a home office system comprising:
  a past actions analysis device adapted to:
    determine items which have been repeatedly purchased by the shopper;
    provide the repeatedly purchased items to the shopper's computing device; and
    determine the period when the shopper buys the items;
  a predictive engine adapted to:
    receive the purchase periods for each item;
    predict purchase dates to buy items from the received purchase period of each item;
    create a purchase list from the predicted purchase dates and items manually added by the shopper;
  a list modification device coupled to the predictive engine adapted to:
    receive a maximum budgeted amount indicating the maximum amount to be spent on a shopping session;
    create a purchase list from the master list having a plurality of items that are desired to be purchased at the next upcoming shopping session each listed on a separate line from top to bottom, with the top item being the most important to the bottom line being the least important;
    display the purchase list through the shopper's computing device to the shopper;
    determine which items can be purchased starting with the highest priority rating to the lowest without exceeding the maximum budgeted amount;
    receive input from the shopper to adjust the purchase list; and
    provide the purchase list to the shopper's computing device for on-line or in-store purchase of items on the list;
    if a combined cost of the items on the purchase list exceeds the maximum budgeted amount, then functioning to interact with the shopper's computing device to move items above other items to indicate their relative importance until all are organized by importance; and
    delete items starting from the bottom of the purchase list until the items remaining cost less than the maximum budgeted amount; and
  a priority/period adjuster coupled to the list modification device adapted to:
    monitor the shopper's adjustments to the purchase list, and
    adjust priority rating of at least one item on the purchase list based upon the shopper's adjustments; and
    store the adjusted priority ratings for subsequent uses, thereby increasing their accuracy with use.

10. The system of claim 9 wherein the store system further comprises:

a pharmacy database having information on past prescription purchases, coupled to the controller.

11. The system of claim 9 wherein the store system further comprises:

an auto center database having information on past automotive purchases, coupled to the controller.

12. The system of claim 9, wherein:

the items purchased are grocery items.

* * * * *